(12) United States Patent
Summers et al.

(10) Patent No.: US 11,966,472 B2
(45) Date of Patent: *Apr. 23, 2024

(54) KNOWN-DEPLOYED FILE METADATA REPOSITORY AND ANALYSIS ENGINE

(71) Applicant: Bank of America Corporation, Charlotte, NC (US)

(72) Inventors: Dan E. Summers, Buckley (GB); Jeffrey Texada, Carrollton, TX (US); Matthew E. Kelly, Chicago, IL (US); Steven Dimaria, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,638

(22) Filed: May 13, 2021

(65) Prior Publication Data

US 2022/0366045 A1 Nov. 17, 2022

(51) Int. Cl.
*G06F 21/56* (2013.01)
*G06F 21/53* (2013.01)
*G06F 21/55* (2013.01)

(52) U.S. Cl.
CPC ............ *G06F 21/565* (2013.01); *G06F 21/53* (2013.01); *G06F 21/552* (2013.01)

(58) Field of Classification Search
CPC .............................. G06F 21/565; G06F 21/53
See application file for complete search history.

(56) References Cited

U.S. PATENT DOCUMENTS

| | | |
|---|---|---|
| 7,350,204 B2 | 3/2008 | Lambert et al. |
| 7,886,049 B2 | 2/2011 | Adelstein et al. |
| 8,176,336 B1 | 5/2012 | Mao et al. |
| 8,468,602 B2 | 6/2013 | McDougal et al. |

(Continued)

OTHER PUBLICATIONS

Sriram Raghavan • S. V. Raghavan; AssocGEN: Engine for analyzing metadata based associations in digital evidence; 2013 8th International Workshop on Systematic Approaches to Digital Forensics Engineering (SADFE) (pp. 1-8); (Year: 2013).*

(Continued)

*Primary Examiner* — Jahangir Kabir
*Assistant Examiner* — Chao Wang
(74) *Attorney, Agent, or Firm* — Banner & Witcoff, Ltd.

(57) ABSTRACT

A known-deployed file metadata repository (KDFMR) and analysis engine enumerates reference lists of files stored on a software delivery point (SDP) and compares the enumerated list of files and associated metadata to previously stored values in the KDFMR. If newly stored or modified files are identified, the analysis engine acquires the files from the SDP. Each file is analyzed to determine whether the file is an atomic file or a container file and metadata is generated or extracted. Each file stored in a container file is recursively extracted and analyzed, where metadata is generated for each extracted file and each container file. The KDFMR periodically analyzes the files stored on the SDP for differences to maintain the currency of the KDFMR data with respect to files stored on the SDP. Storage or modification of files on the SDP triggers analysis of the associated file. KDFMR data is updated with metadata determined based on sandbox detonation of files and/or identified artifacts of known-deployed files.

20 Claims, 4 Drawing Sheets

(56) References Cited

U.S. PATENT DOCUMENTS

| | | | |
|---|---|---|---|
| 9,563,460 | B2 | 2/2017 | Fitzgerald et al. |
| 9,886,443 | B1* | 2/2018 | Gupta .................. G06F 16/188 |
| 9,922,033 | B1* | 3/2018 | Odedra ................ G06F 16/951 |
| 10,860,717 | B1 | 12/2020 | Edmonds |
| 11,288,368 | B1 | 3/2022 | Wesson |
| 2006/0206498 | A1* | 9/2006 | Fujiwara ................ G06F 16/38 |
| 2015/0133106 | A1* | 5/2015 | Nakamura ............. H04L 67/34 |
| | | | 455/419 |
| 2016/0099960 | A1 | 4/2016 | Gerritz et al. |
| 2018/0285199 | A1* | 10/2018 | Mitkar ................ G06F 11/2038 |
| 2019/0114421 | A1* | 4/2019 | Das ....................... G06F 21/566 |
| 2020/0112557 | A1* | 4/2020 | McCullough, IV ...... H04L 9/50 |

OTHER PUBLICATIONS

Tyler J. Skluzacek • Rohan Kumar • Ryan Chard • Galen Harrison • Paul Beckman • Kyle Chard • Ian T. Foster; Skluma: An Extensible Metadata Extraction Pipeline for Disorganized Data; 2018 IEEE 14th International Conference on e-Science (e-Science) (pp. 256-266); (Year: 2018).*

Gonzalo P. Rodrigo • Matt Henderson • Gunther H. Weber • Colin Ophus • Katie Antypas • Lavanya Ramakrishnan; ScienceSearch: Enabling Search through Automatic Metadata Generation; 2018 IEEE 14th International Conference on e-Science (e-Science) (pp. 93-104); (Year: 2018).*

Tyler J. Skluzacek, et al., Skluma: An extensible metadata extraction pipeline for disorganized data, 2018 IEEE 14th International Conference on e-Science, DOI 10.1109/eScience.2019.00040, pp. 256-266.

Gonzalo P. Rodrigo, et al., ScienceSearch: Enabling Search through Automatic Metadata Generation, 2018 IEEE 14th International Conference on e-Science, DOI 10.1109/eScience.2018.00025, pp. 93-104.

Sriram Raghavan, et al., AssocGEN: Engtine for Analysing Metadata Based Associations in Digital Evidence, 978/1-4799-4061-5/13 @2013 IEEE, downloaded on Nov. 30, 2023 from IEEE Xplore, pp. 8.

* cited by examiner

KNOWN-DEPLOYED FILE METADATA REPOSITORY AND ANALYSIS ENGINE

BACKGROUND

In an attempt to keep ahead of enterprise security measures, attackers continually adapt their methods in an attempt to keep ahead of the ability of enterprise network security procedures. Because sophisticated means of intercepting encrypted files are currently available, perpetrators may focus on alternative ways of avoiding data security. Often, Cyber-security detection and response processes involve differentiating permissible, expected or otherwise benign behaviors from various observed behaviors that are generated by an adversary and/or by an insider threat. On a host endpoint computing device under review this may be difficult. Often, this may require that security systems to determine which artifacts (e.g., binary files, scripts, and the like) have been introduced to the system by an outside malicious user or which artifacts have been leveraged for malign intent such as by using so-called "Living off the Land Binaries and Scripts" (LOLBAS) against a background of pre-existing and non-relevant artifacts.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identification and deployment of files that are known to be approved and centrally deployed within that environment. A known-deployed file metadata repository (KDFMR) and analysis engine enumerates reference lists of files stored on a software delivery point (SDP) and compares the enumerated list of files and associated metadata to previously stored values in the KDFMR. If newly stored or modified files are identified, the analysis engine acquires the files from the SDP. Each file is analyzed to determine whether the file is an atomic file or a container file and metadata is generated or extracted. Each file stored in a container file is recursively extracted and analyzed, where metadata is generated for each extracted file and each container file. The KDFMR periodically analyzes the files stored on the SDP for differences to maintain the currency of the KDFMR data with respect to files stored on the SDP. Storage or modification of files on the SDP triggers analysis of the associated file. KDFMR data is updated with metadata determined based on sandbox detonation of analyzed files.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
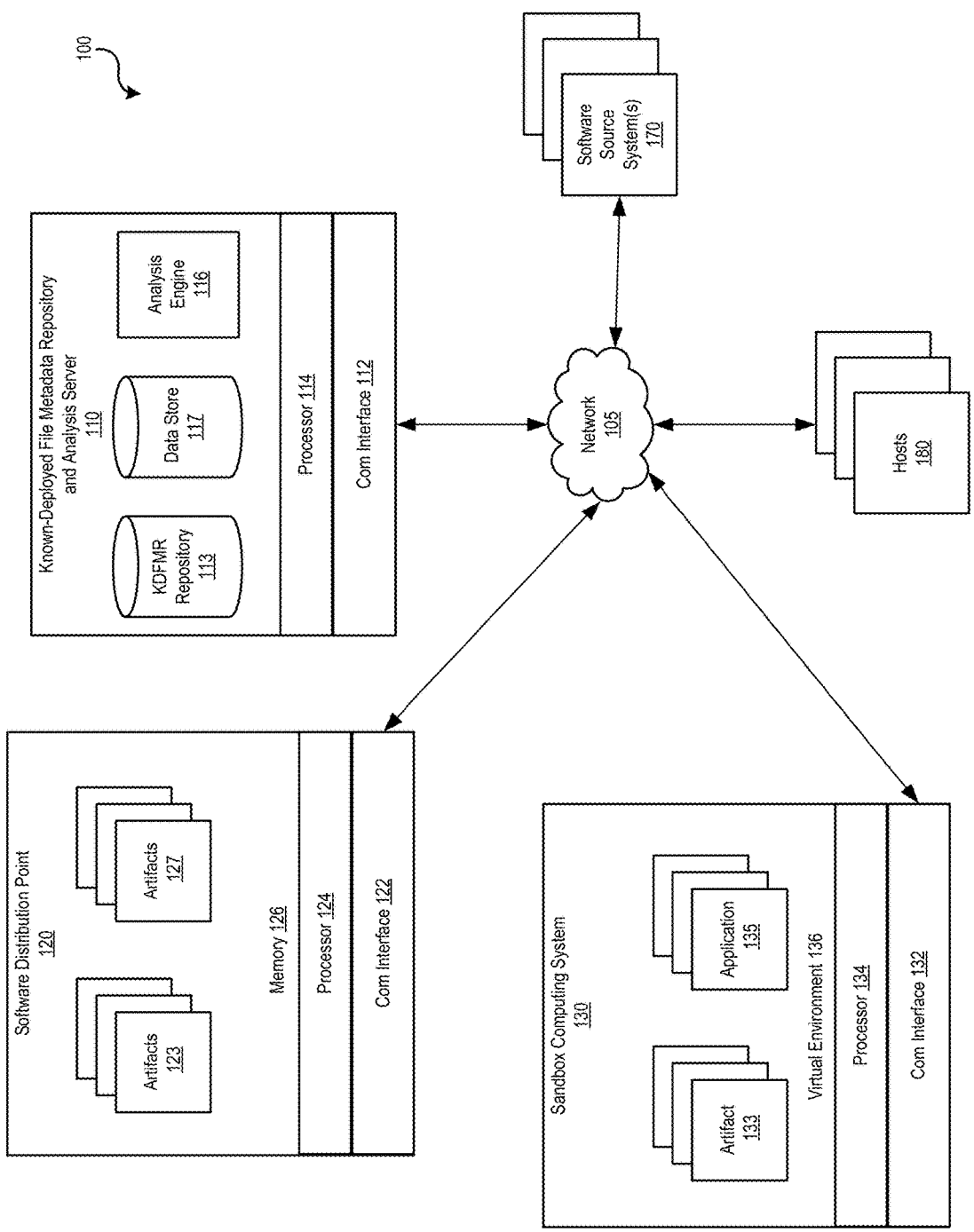
FIG. 1 shows an illustrative computing environment implementing a known-deployed file repository and analysis system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the invention.

In the past, when a new software version or build was prepared for release, a build or executable may be uploaded to a distribution server (e.g., an FTP server) for distribution. As an example, early software release management may have been as simple as performing a build, uploading the results to a FTP server, updating a web site, and/or communicating that a new release was ready for download via an email or other message. Today, however, due at least in part to security considerations and/or software complexity, software packages and/or releases performed by enterprise organizations may utilize release management and artifact repositories to deliver software and infrastructure today. Some software or artifact repositories, such as software distribution points, may support secure deployments of artifacts for multiple machines and/or installations, sometimes supporting continuous delivery, to multiple data centers via a world-wide network.

For software development, an artifact may be any deliverable associated with a project (e.g., documentation, executable code, and the like) and may be stored in the form of a large binary package. An artifact may help to describe software functionality, architecture, and/or its design. Illustrative examples of artifacts may include, but are not limited to, source code, meeting notes, workflow diagrams, data models, risk assessments, use cases, prototypes, a compiled application, and the like. During development, an artifact list or plan may be developed to include all artifacts that may be required for a project. Such artifacts may be shared via a shared drive, an artifact repository, a software distribution point and the like. Artifact repositories or software distribution points may be used to store, version and/or deploy artifacts for builds. In some cases, artifact repositories may be designed to store many types of files, such as from binary files to containers. Illustrative artifact repositories may be a locally managed repository, a remote (or caching) repository may be managed at a remote location and accessed via a universal resource locator (URL). In some cases, a repository (e.g., a virtual repository) may be a combination of features of a local repository and a remote repository and may be accessed via a common URL.

A deployment artifact (or a build) may be the application code as it runs on production after it is compiled, built, bundled, minified, optimized, and/or the like. In some cases, the deployment artifact may be a single binary. Sometimes the deployment artifact may be multiple files compressed in an archive or other container. The artifact can be stored and/or versioned.

An artifact may be configured and designed to be downloaded quickly onto a server, and run immediately, with no service interruption. Further, artifacts may be configurable to be deployable on any environment. For example, if an artifact is to be deployed onto a staging server and a production server, the same artifact can be used for both deployments—only the configuration must change, not the artifact.

In some cases, artifact repositories or software distribution points may store one or more types of artifacts, such as release artifacts and snapshot artifacts. A release repository may be used to store release artifacts which are static or otherwise stable. Snapshot repositories, on the other hand, may be used to store snapshot artifacts (e.g., binary software artifacts) which may be frequently updated while projects under go development. In some cases, a repository may serve as a combined release repository and snapshot repository. In some cases, other repositories may be segmented to server a particular purpose, such as for release or development purposes and may maintain different standards and/or procedures for deploying artifacts. In some cases, a release repository or software development point may be considered to be a production network for support of released software products. A snapshot repository may be considered to be a development or a testing network. Release repositories and/or software distribution points may formalize procedures to support product deployments. Snapshot repositories or software distribution points may allow snapshot artifacts to be deployed and/or changed frequently with or without regard for stability and repeatability concerns. Once published or stored in an artifact repository or software development point, an artifact and the metadata describing that artifact, particularly of release artifacts, do not change. As a result, projects that depend from such stable artifacts will be repeatable and stable overtime. In some cases, an organization may utilize a central software distribution points and/or mirrored repositories A release artifact may be an artifact which was created by or for a specific, versioned release. Further, released artifacts may be solid, stable, and/or perpetual to guarantee that builds that depend upon the released artifacts are solid and repeatable over time. In some cases, a released artifact may further be associated with metadata that may include a signature (e.g., a PGP signature), a hash or checksum (e.g., an MD5 hash and SHA checksum). Such metadata may be used to provide information about the artifact, software associated with the artifact, and/or may be used to verify one or both of authenticity and integrity of the associated binary software artifact.

Snapshot artifacts may be artifacts generated during the development of a software project. In some cases, snapshot artifacts (as well as release artifacts) may include metadata such as a version number, a timestamp, a signature, a checksum or hash, and the like. In some cases, version information and/or timestamp information may also be included in an artifact's name.

In some cases, artifact repositories or software distribution points may also associate metadata to assist in classifying and/or organizing artifacts. For example, artifact metadata may include a group identifier that may be used to organize artifacts into logical groups, such as by organization, software development group, associated application type, and the like. Artifact metadata may include artifact identifiers that may be used to identify an associated software component (e.g., an application, a library, and the like). Artifact metadata may further include versioning metadata that may be used to identify major release versions, minor release versions, iterative (e.g., point) release versions. In some cases, versioning metadata may also include a release status identifier (e.g., alpha, beta) such as to identify a testing stage. In some cases, the artifact metadata may further include a packaging identifier that may be used to identify whether an artifact corresponds to a single binary package or a container that contains multiple binary artifacts. The container may be any type of binary packaging format (e.g., zip, swc, swf, war, and the like). Additional metadata may further include a project object model, or other similar identifier, that may be used to describe or otherwise identify the artifact and any dependencies required for the associated artifact.

Because artifacts have become ubiquitous, cybersecurity detection and response processes have evolved to differentiate observed behavior by malicious users or insider threats to those that are permissible, expected or otherwise benign. When a host endpoint is under review, a cybersecurity computing device may analyze data stored on or used by the host endpoint to differentiate between artifacts—including binary files and scripts—that have been introduced to the system by the adversary and/or have been leveraged for malign intent such as by LOLBAS from a background of pre-existing and benign artifacts. Approaches to this requirement may include a comparison of the cryptographic hashes for discovered artifacts against public sandbox data to identify different classifications of artifacts (e.g., "known-bad", "known-good", "known", "seen" and the like) such as by utilizing static or periodically updated reference sets such as the National Software Reference Library (NSRL) which may be used to identify "known" artifacts. Some approaches may include periodically calculating and/or identifying "Least Frequent Occurrence" of hashes observed in an environment, where the premise is that adversary artifacts may be rarer than benign artifacts. In some cases, centralized outputs of host-based agents that monitor artifact creation and/or use may be leveraged to identify artifacts that were observed in the environment, a location of use, and/or a frequency of use.

Each of approach may be limited in one or more of the following respects. Artifact hashes are not specific to the environment of the host endpoint under review, so that benign artifacts that are custom or rare are likely not represented in the reference sets and often have to be manually accounted for. Artifact hashes are not specific to the environment of the host endpoint under review so that a presence of an artifact does not necessarily imply that that particular artifact is permitted or expected. Artifact hashes may not be updated on sufficient frequency to account for legitimate changes to the environment at scale. While artifacts may be identified in a particular software distribution point or other computing device, artifact hashes observed in a specific environment may not identify how the artifact came to be present on the host endpoint. While adversary or malicious artifacts may be rare in an environment, the converse is not true. Rare does not imply malice, because many rare benign artifacts may exist for various legitimate reasons. Further, adversary artifacts may not be rare either, particularly if highly privileged credentials have been obtained for the environment and/or worm capabilities are in effect. Legitimate artifact hashes that are associated with known and/or approved software and configurations may not be labelled to identify that the artifact also has a known adversary use (e.g., a LOLBAS status) so that such artifacts may be filtered from analysis and overlooked during or at least not highlighted for such analysis.

As organizations are increasingly mandating and implementing centralized operating system and software deployment and inventory mechanisms, such as software distribution points (SDPs), and applying policy and technical controls to limit artifact acquisition outside of SDPs, an opportunity exists to leverage artifact metadata gathered by such mechanisms while establishing a status of an observed artifact as being "known-deployed" and by implication expected and approved—rather than merely "seen" or "known".

A known-deployed file metadata repository (KDFMR) and analysis engine may be configured to identify and/or correlate identified artifact cryptographic hashes and/or other metadata of artifact entries with event log and/or security sensor output that may be captured by the SDPs. While metadata storage technology and/or a format used by a software distribution point may be proprietary and/or problematic to access, query and/or extend to allow for required security analysis, the KDFMR and analysis engine may be capable of being adapted and/or may be extended via software development kits and/or an application programming interface to interface with newly encountered or developed formats, or technologies. Additional problems overcome by the KDFMR and analysis engine may include that multiple Software Distribution Point technologies and/or mechanisms may be installed and operational in a computing environment used by different subsets of host endpoints such that no single platform contains a complete view across a complete enterprise computing environment and/or such that the metadata entries are irregular and/or partial with respect to each different Software Distribution Point technology. The KDFMR and analysis engine addresses and resolves such identified problems by providing a consistent set of methods and systems to generate and store necessary metadata to enable analytic separation of known-deployed artifacts from those not known to be approved and centrally deployed, including those introduced by adversary activity. Further, the KDFMR and analysis engine provides for extension of the metadata that was identified so that the KDFMR and may reflect potential adversary use, a LOLBAS status, and/or other metadata that may be used to facilitate and expedite analysis during detection and response.

FIG. 1 shows an illustrative computing environment 100 implementing a known-deployed file metadata repository and analysis system in accordance with one or more aspects described herein. The computing environment 100 may include a known-deployed file metadata repository (KDFMR) and analysis server 110, a software distribution point 120, a sandbox computing system 130, one or more software source systems 170, and/or one or more host computing devices 180. The KDFMR and analysis server 110, the software distribution point 120, the sandbox computing system 130, the one or more software source systems 170, and/or one the or more host computing devices 180 may be communicatively coupled via a network 105.

The KDFMR and analysis server 110 may include a processor 114 or a plurality of processors, for controlling overall operation of the KDFMR and analysis server 110 and its associated components, including the one or more memory devices (not shown) (e.g., a non-transitory memory device, a random-access memory (RAM) device, a read only memory (ROM), and the like), an input/output (I/O) interface or I/O devices, and the like. The KDFMR and analysis server 110 may communicate with one or more external devices, such as the software distribution point 120, the sandbox computing system 130, the one or more software source systems 170, and/or one the or more host computing devices 180 via the network 105, a telecommunications network, an enterprise network and the like via the communication interface 112. Network connections that may be communicatively coupled to the communication interfaces 407 may include a local area network (LAN) and/or a wide area network (WAN), a wireless telecommunications network, a wired communications network and/or may also include other communications networks. When used in a LAN networking environment, the KDFMR and analysis server 110 may be connected to one or more communications networks (e.g., the network 105) through a network interface or adapter. When used in a WAN networking environment, the KDFMR and analysis server 110 and/or the communication interface 112 may include a modem or other means for establishing communications over the WAN, such as the Internet, a cellular network, and the like. When used in a wireless telecommunications network, the KDFMR and analysis server 110 may include one or more transceivers, digital signal processors, and additional circuitry and software for communicating with wireless computing devices via one or more network devices (e.g., base transceiver stations) in the wireless network.

The KDFMR and analysis server 110 may store one or more data repositories, such as the KDFMR repository 113, the data store 117, and/or the like. The KDFMR and analysis server 110 may also process instructions to provide analysis and security functions for deployed artifacts by enabling operation of an analysis engine 116. The analysis engine 116 may leverage multiple software distribution point (SDP) technologies within the computing environment 100 to provide a vendor agnostic interface with a plurality of SDP technologies provided by different vendors. In doing so, the KDFMR and analysis server 110 may leverage the various SDP technologies deployed within the computing environment 100 to source files that are known to be approved and centrally deployed within that environment. Because each SDP technology may utilize a different, or multiple, access protocols the KDFMR and analysis takes a modular approach to acquiring the files according to which protocols are in use for the particular SDP 120.

The known-deployed file metadata repository 113 may, for example, be a database used to store metadata associated with a plurality of artifacts managed via one or more software distribution points, such as the SDP 120. The KDFMR 113 may include a plurality of data structures storing artifact metadata including, for example, a file name, a file creation date, a modification date, a checksum or hash value, an indication of files associated with artifact, an indication of a software distribution point, an indication of a software application associated with the artifact, an indication of a source of the artifact, an indication that the artifact is a known artifact, an indication that the associated artifact is known to have been deployed safely within the computing environment 100 or other associated enterprise computing environments, and the like. The analysis engine 116 may analyze files stored on one or more SDPs, such as the software distribution point 120, to determine whether an artifact can safely be deployed within the computing environment, such as by using the method(s) discussed below with respect to FIG. 2.

The data store 117 may include additional information corresponding to artifacts and/or artifact identification. Such information may be leveraged by the analysis engine when evaluating existing, changed and/or newly deployed artifacts. For example, artifacts 123 may represent previously existing and analyzed artifacts stored within the SDP 120 and artifacts 127 may represent newly stored or modified artifacts that need to be analyzed before deployment can be contemplated. In some cases, the data store 117 may store metadata, such as file names, file dates, hashes and/or checksums associated with "known" artifacts that have been identified by a standards organization and/or the enterprise itself. For example, the data store 117 may store information obtained from the National Software Reference Library (NSRL), which archives copies of the world's most widely installed software titles. The NSRL is maintained by the National Institute of Standards and Technology (NIST) to allow cybersecurity and forensics experts to track an immense and ever-growing volume of software on the world's computers, mobile phones and other digital devices. Other similar collections may also be leveraged and/or stored within the data store 117. The NSRL includes a digital fingerprint of all software analyzed by NIST, which may be stored as a hash that uniquely identifies each file. The reference data set provided by NIST that includes a listing of each hash of all known software. The reference data set is updated periodically and may be downloaded and stored within the data store 117. In some cases, a download of the reference data set may initiate the KDFMR repository and analysis engine to re-analyze each artifact or artifact record to update records of known files and known deployed files stored in the data stores 113 and 117. The data store 117 may store metadata on computer files which can be used to uniquely identify the files and their provenance. For example, the metadata may include cryptographic hash values (e.g., a MD5 hash, a SHA-1 hash, a SHA-256 hash, and the like) of the file's content to uniquely identify the file even if, for example, it has been renamed. The metadata may further include data about the file's origin, including the software package(s) containing the file and the manufacturer of the package, a file's original name and size. and the like. The data store 117 may store information identifying whether a file is "known", not necessarily whether the file is "known-good" or "known-bad". The data store 117 may store hashes and other metadata associated with valid "safe" applications and associated with applications traditionally viewed as being malicious (e.g., encryption tools, steganography tools, malicious access tools, and the like). In some cases, the analysis engine 116 may utilize the data store 117 information to perform approximate matching to assess and/or quantify a relationship between files. For example, the analysis engine 116 may utilize one or more resemblance query algorithms and/or containment query algorithms. For example, the analysis engine 116 may perform operations such as object similarity detection, cross correlation, embedded object detection, fragment detection and the like. In some cases, the analysis may use bytewise matching techniques, syntactic matching techniques, semantic matching techniques, fuzzy hashing techniques, and the like. In some cases, internal development groups and/or trusted vendors may provide known good versions of applications and/or artifacts and its associated metadata. In some cases such known-good metadata may be included in an update to the data store 117.

The software distribution point 120 may comprise deployment management application(s) installed and running on a host computing device that may include one or ore processors 124, a communication interface 122 to facilitate communication via the network 105, and memory 126 storing one or more artifacts associated with software deployed within an enterprise computing network, such as the computing environment 100. The SDP 120 may be used to deliver content to a plurality of client computing devices (e.g., the host computing devices 180) via the network. For example, when a client computing device needs to download a new operating system, an application, driver, or a portion of an application or a software package, the client computing device contacts the SDP 120. In some cases, the SDP may manage deployment artifacts (e.g., the artifacts 123, 127) stored in memory and that may be provided by one or more different sources, either known or unknown, such as the software source computing systems 170. The deployment artifact may be application code, or other information, as it runs in production which has been compiled, built, bundled, minified, and/or optimized. In some cases, each artifact 123 may be stored as a single binary file. In some cases, the artifact may comprise one or more container files that may each store one or more different artifacts compressed, such as in an archive file format. Each artifact file may be associated with a particular version or build and may be configured to be deployed quickly within a network and run with no service interruption, or a minimum of service interruption. Artifact-based deployment comes with many advantages as it allows quick to deploy, allows instant rollback, provides backups that are available and ready to run. Artifacts allow for running the exact same code on every environment so that deployment becomes a configuration issue. Because of this malicious users or organizations and/or inside threats may attempt to leverage artifacts and/or software distribution points to improperly access enterprise computing networks.

The sandbox computing system 130 may include a communication interface 132, one or more processors 134 and one or more virtual environment, such as the virtual environment 136.

In some cases, the known-deployed file metadata repository and analysis server 110 may identify one or more newly modified or downloaded artifacts stored on the software distribution point 120. After identifying the presence of unknown, modified, or new artifacts, the analysis engine 116 may cause the deployment of one or more suspect artifacts 133 within the virtual environment 136, with or without additional or corresponding applications 135. The secure sandbox computing environment may be used to isolate the deployed suspect artifact from the protected networks (e.g., the enterprise computing network) and the host computing devices 180. Within the sandboxed computing environment, the analysis engine 116 or other monitoring software packages may monitor the deployed artifact(s)t for malicious or potentially malicious activity. An artifact hash may be used to identify and/or track the artifact activity and testing, and may be used to classify each artifact as being "known-good", "known-bad", indeterminate and the like. each hash may be compared to information stored in a data store containing hashes of previously accessed content. In some cases, the hashes stored in one or more data stores may be categorized, such as with a category being associated with content that is safe to access, content including potentially malicious content, as malicious content, and the like. In some cases, the malicious content may further be categorized, such as with respect to a severity of harm that may be inflicted on the security, integrity, and/or operation computing devices across the enterprise computing system.

Additionally or alternatively to detonation of files to determine malicious or suspicious activity associated with the files, the sandbox computing system 130 may use file detonation to identify artifacts and/or traces of known-deployed files and indications as to how such files are used. For example, the file artifacts obtained through detonation of files by the sandbox computing system 130 may be used to eliminate traces of expected behavior of known-deployed files and, therefore, remove these from investigation for malicious activity. Such elimination of know-deployed files is particularly relevant to identification of LOLBAS, because the file artifacts may have benign expected uses and/or may be associated with Autostart Execution Point (ASEP) entries, or other commands that are initiated automatically upon startup of a computing device. and high volume ASEPs that are as a result of deployment. As such, identifying known-deployed files minimizes the number of traces and/or artifacts that need to be reviewed by security computing systems or security analysts because a large amount of benign activity would already be identified and accounted for.

Figure 2:
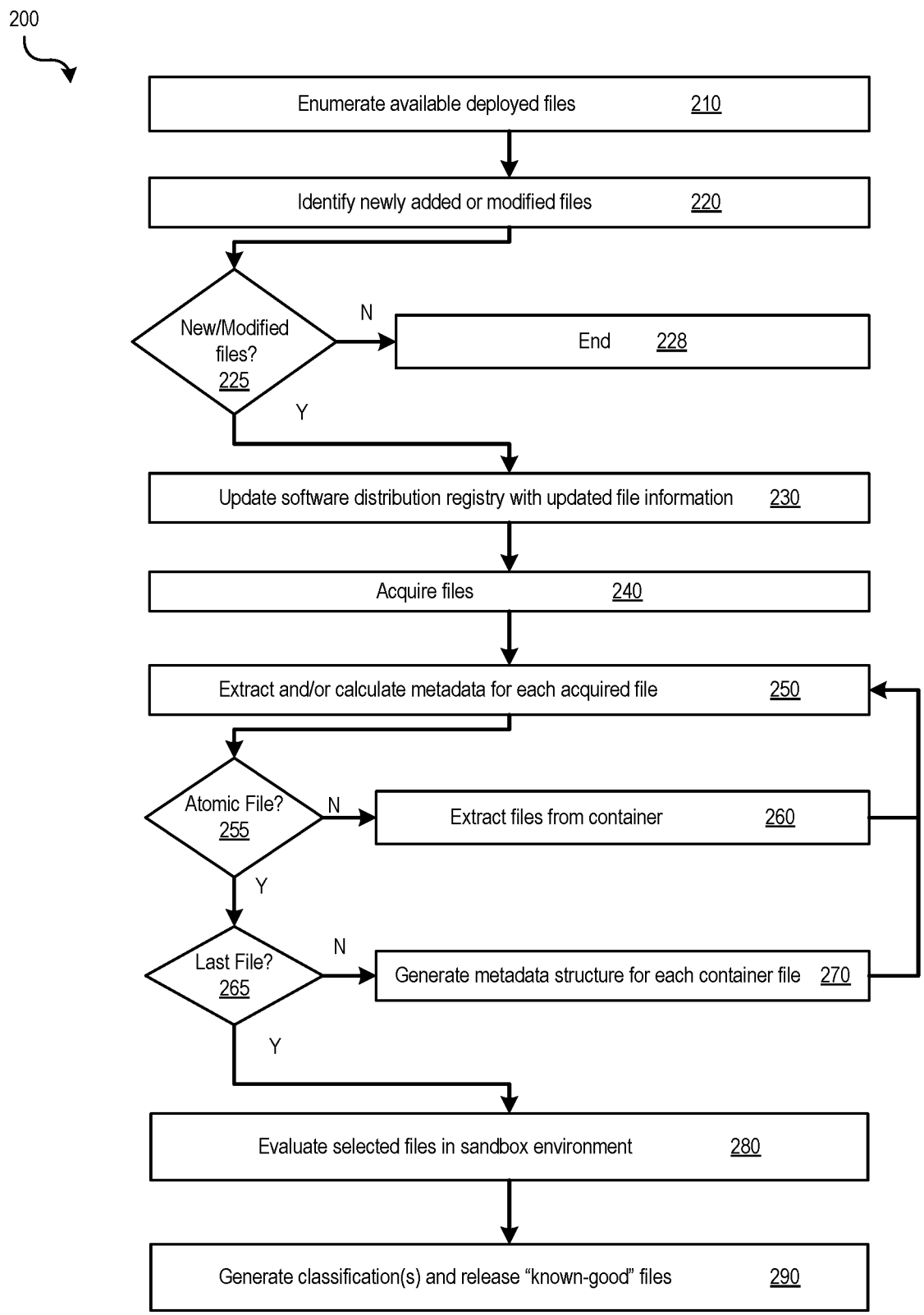
FIG. 2 shows an illustrative method for generation and use of a known-deployed file repository in accordance with one or more aspects described herein.

FIG. 2 shows an illustrative method 200 for generation and use of a known-deployed file repository in accordance with one or more aspects described herein. At 210, the KDFMR analysis engine 116, once the SDP 120 is accessible and is storing one or more artifacts 123, 127, may enumerate available deployed artifact files. The analysis engine 116 may enumerate the artifact s 123, 127 by reference to a catalog provided by the SDP, where present. In some cases, the analysis engine 116 may, if the SDP 120 implements a native file share (e.g., an operation system file share), perform a directory listing or equivalent. At 220, the analysis engine 116 may identify newly added artifacts 127. For example, the analysis engine 116 may compare the enumerated file listing with their respective SDP platform paths and/or logical locations and any associated metadata available from a catalog or directory listing that indicates last modified/created dates or the like, to information stored in the data stores 113, 117. For example, the analysis engine may compare the artifact metadata against any previously stored values, statuses, and may store or modify such details for those that have not already been acquired. In some cases, the analysis engine 116 may update the data stores with metadata indicating a change since a last acquisition.

At 225, the analysis engine 116 may determine whether new or modified artifacts 127 have been found. If not, the process ends at 228. If, at 225, the analysis engine 116 identifies modified files, at 230 the analysis engine 126 may log any SDP logical locations that have been newly stored or modified and may be passed to the appropriate module within KDFMR that is registered as providing file acquisition functions for the SDP technology, e.g., a SDP communication technology enabled module, function, application programming interface or the like. At 240, the analysis engine 116 may acquire each file and may then pass the file to a module that is able to confirm whether the artifact file is a container file format (e.g., a format that is known to contain other files or artifacts including but not limited to disk image formats, archives compresses or otherwise, portable executables, compound document formats, and the like) or whether the file is atomic and does not contain other files.

At 250, for each file acquired directly from the SDP that is atomic or a container file, the analysis engine 116 may process the file to calculate and/or extract the required metadata. This metadata may include, but not be limited to, cryptographic hashes, checksums, file signatures, sizes, file magic bytes and the like. The analysis engine 116 may store the metadata in one or both of the data stores 113, 117 and may link the metadata and the artifact file to its SDP logical location. At 255, the analysis engine 116 analyzes each file to determine whether a file is atomic or a container file. If so, at 260, for each file that is contained within a container, the previous steps may be repeated recursively to determine whether a particular file is a container file or an atomic file. If, at 265, a last file has not been reached, then at 270 the analysis engine 116 may generate and store metadata with respect to a relative path of a contained file extracted from the container file with respect to a location where its top-most container file is stored—rather than to a reference to the SDP logical location. In some cases, a cryptographic hash of a container file's top-most container and the file's immediate container may be stored to enable metadata that already exists for a given container to be used rather than requiring the analysis engine 116 to perform re-extraction and recalculation. If for a given contained container file, a cryptographic hash entry already exists, recursive extraction and metadata generation can cease for this file.

In some cases, the enumeration of available deployed files on the SDP 120 may be scheduled such that the KDFMR analysis engine 116 may periodically (e.g., daily, weekly, hourly, and the like) check for new or modified deployed files, thereby maintaining a currency of the KDFMR data stored in the data stores 113, 117 with respect to the actual deployed files available from the SDP 120.

In some cases, the analysis engine 116 may perform additional steps when the SDP technology has expanded functionality, either by design or due to features, and/or based on features for a storage mechanism used by the SDP 120 to host its files. For example, the SDP 120 may provide log, alert, message, or other notification upon the addition or modification of a deployed file that can be made accessible to the KDFMR upon which the process above is initiated specifically for that file or files. In some cases, a storage mechanism employed by the SDP 120 to host its files may provide audit settings to generate and/or otherwise make available an event specifying a location of a created or modified file upon such occurrence. This event may be collected by another system (e.g., a monitoring application) that is configured to notify the KDFMR system upon receipt or identification of a file creation by the SDP 120, which may then trigger the analysis engine to perform the above process for that file or files.

In some cases, additional to or as part of a metadata generation process or as a separate process to stored data in the data stores 113, 117, the analysis engine 116 may enrich the artifact file metadata with labels to identify a functionality associated with the artifact. For example, such information may indicate that an artifact file may be known to also be used for adversary purposes (e.g., an artifact file is labeled as a LOLBAS). In some cases, this information may be further extended with additional metadata such as references to thesauri, taxonomies, ontologies and/or other reference materials that may further detail adversary employment of such artifacts. Such information may include, but not be limited to, techniques, tactics, and procedures (TTPs) where the artifact is either necessary for or sufficient to obtain the adversarial objective. In some cases, the information may serve a specific and/or a limited purpose within the computing environment or within a specified computing business context in which the host endpoints to which it is intended to be deployed operate. Such information may be used to add further context to the artifact functionality including, but not limited to, identifying whether the artifact is expected to be found on a particular class or category of host endpoint, whether it has ongoing approval for use, business and technical ownership, whether the artifact has an association with higher level business applications or components, and/or whether the artifact has a status of known security vulnerabilities and/or vendor support.

In some cases, the KDFMR and analysis server 110 may expose an application programming interface (API) to provide functions that allow external systems to query the KDFMR data store 113 and/or the data store 117 for reference to atomic value and/or sets of values, identification and/or extraction of patterns within values, and/or functions according to other logic that is available in the chosen implementation languages and data storage technologies via a custom programming interface.

In some cases, the KDFMR and analysis server 110 may be configured to synchronize or communicate a copy or a subset of its stored metadata to an external analytic platform or platforms such as a log management system, a security information and event management (STEM) system, and/or other data processing or storage system, either periodically or upon generation of new or changed metadata entries. Such functionality may enable the KDFMR data to be used as an enrichment data set, filter criteria, search criteria, and/or otherwise may be used analytically within the target platform against existing security events and data. An advantage of the KDFMR and analysis server 110 is, at least in part, due to what is not stored in its database as much as what it does. For example, the KDFMR data does not have references to files that may only be 'known' (e.g. information obtained from NSRL) and which may be present on a host in the environment. As such, known files that are not available via the SDP 120, as opposed to known-deployed files available via the SDP 120, allows the KDFMR and analysis server 110 to conclude that a particular file, while 'known', was introduced to a host through methods other than via approved software distribution practices and/or the SDP 120. Because the file is not 'known-deployed' the presence of these 'known' files represents manual intervention, adversary or malicious activity, or a policy breach, or the like. These distinctions may be missed through present analysis techniques, allowing the these improperly present 'known' files to be missed because the negative responses to such queries (e.g., identification of unknown files) have been the main focus of the present analysis.

In some cases, the KDFMR and analysis server 110 may send, at 280, the acquired files to a security sandbox device (e.g., the sandbox computing system 130) for detonation and/or may store the resultant traces and additional metadata obtained from such detonations of files linked to the artifact entries existing in the KDFMR 113. In the case of files that include disk images, such files may provide an additional basis of the sandboxed execution environment in cases where the disk image is self-contained so that production infrastructure may not be required outside of the sandbox for further configuration or if a preconfigured sandbox machine with the disk image applied is available for use. In each case, this metadata may be further processed by the KDFMR and analysis server to, for example at 290, generate lists of known paths, system entries and/or filenames as the deployed artifacts would appear on a host endpoint, normalizing for variable locations such as user directories or deterministically generated paths and names, particularly where this is different to those paths within a given Container File due to renaming and/or host configuration operations. In doing so, the analysis engine 116 may detect a file masquerading (e.g., such as where an adversary uses a known-deployed file name for completely different/adversarial content) as an allowed file. In some cases, the analysis engine may identify renaming of known LOLBAS files that may otherwise cause their usage to be missed by an analyst if referring to filename alone. In some cases, the analysis engine may link event log entries, network activity and/or artifact metadata that is only available during dynamic execution to the a particular KDFMR entry of an artifact. In doing so, the analysis engine may normalize paths, locations and/or other attributes that are variable according to the host endpoint or user associated with the detonation of a file. This additional metadata allows the analysis engine to compare expected event log entries, network traffic and dynamic metadata against those actually observed in the environment, thus facilitating detection of unusual usage by allowing elimination of deployment-related activity from analysis, or alternatively/additionally positively confirming that events are related to deployment activity.

In some cases, the known deployed file metadata repository and analysis server 110 may, after confirming a match between metadata of an artifact stored in the SDP 120 and metadata stored in the known deployed file metadata repository 113, trigger deployment of the artifact. In some cases, deployment of files newly stored and/or newly modified on the SDP 120 may be disabled pending confirmation and analysis of the files metadata. Once the new or modified file's metadata is updated, the KDFMR and analysis server 110 may enable distribution of the file by the SDP 120, such as through an API function call or the like.

In some cases, after receiving a submitted file hash-based query, the KDFMR and analysis server 110 may process the file hash-based query and return a status value indicating that an information matching an existing KDFMR record or records was found or that a match was not found. Further, the KDFMR and analysis server 110 may return the status value with or without extended metadata associated with any matched results. In some cases, the KDFMR and analysis server 110 may process a submitted trace artifact criteria-based query where a normalized version of a particular trace artifact (e.g. a registry entry, file path on a host, and the like) is matched against sandbox traces for known-deployed files stored in the KDFMR data store. The KDFMR and analysis server 110 may then return a list of file metadata entries when a match or matches were found or may return an indication that a match was not found. In some cases, the KDFMR and analysis server 110 may process a combined file hash and trace criteria query such that the KDFMR and analysis server 110 may return a list of file metadata entries is returned when both the file hash and the normalized version of the corresponding trace artifact match a sandbox trace for a known-deployed file or files or may return an indication that a match was not found. In some cases, the KDFMR and analysis server 110 may process a file that may be a container file (e.g., a disk image) in a query-only mode, such that a status of the file or files may be returned but the KDFMR may not be updated. In such cases, the KDFMR and analysis server 110 treats the processed file as being of unknown provenance because the file was not acquired from the SDP 120. Here, the KDFMR and analysis server 110 may determine whether the container file or may identify whether one or more particular files, or all contained files, of the container file may be known-deployed and/or may determine whether one or more particular files, or all contained files, of the container files are not. With this query, the file being analyzed may be sourced from a host under investigation. In some cases, the container file query may be structured similarly to a file hash-based query, a trace artifact query, and/or as both a file hash-based query and a trace artifact query, but without requiring the query criteria to include the hashes and/or paths, because these may be calculated from the processed file.

Figure 3:
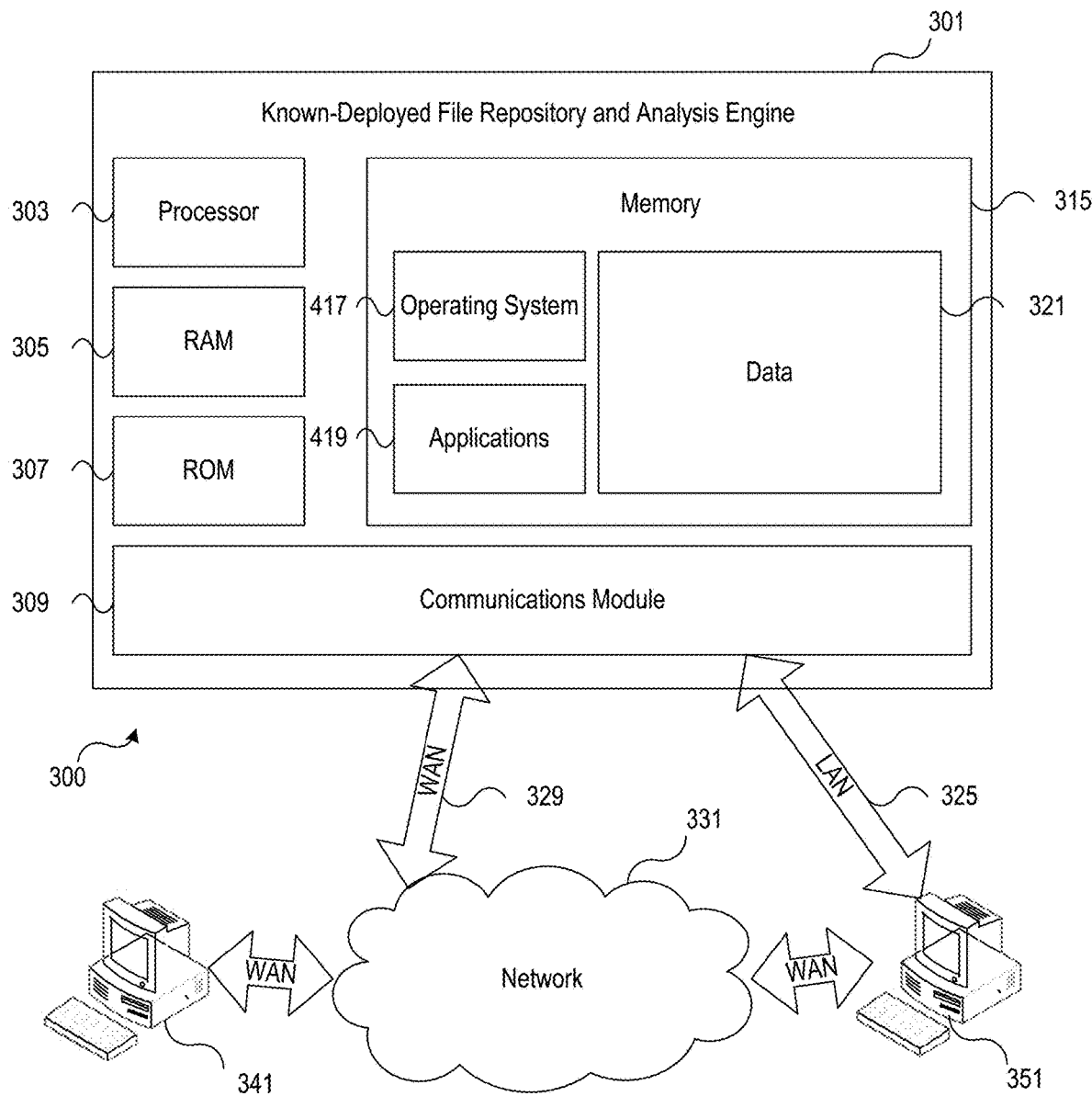
FIG. 3 shows an illustrative operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative steganographic communications analysis engine 301 having a processor 303 for controlling overall operation of the steganographic communications analysis engine 301 and its associated components, including a Random-Access Memory (RAM) 305, a Read-Only Memory (ROM) 307, a communications module 309, and a memory 315. The steganographic communications analysis engine 301 may include a variety of computer readable media. Computer readable media may be any available media that may be accessed by the steganographic communications analysis engine 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the steganographic communications analysis engine 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the steganographic communications analysis engine 301. Such a processor may execute computer-executable instructions stored on a computer-readable medium.

Software may be stored within the memory 315 and/or other digital storage to provide instructions to the processor 303 for enabling the steganographic communications analysis engine 301 to perform various functions as discussed herein. For example, the memory 315 may store software used by the steganographic communications analysis engine 301, such as an operating system 317, one or more application programs 319, and/or an associated database 321. In addition, some or all of the computer executable instructions for the steganographic communications analysis engine 301 may be embodied in hardware or firmware. Although not shown, the RAM 305 may include one or more applications representing the application data stored in the RAM 305 while the steganographic communications analysis engine 301 is on and corresponding software applications (e.g., software tasks) are running on the steganographic communications analysis engine 301.

The communications module 309 may include a microphone, a keypad, a touch screen, and/or a stylus through which a user of the steganographic communications analysis engine 301 may provide input, and may include one or more of a speaker for providing audio output and a video display device for providing textual, audiovisual and/or graphical output. The computing system environment 300 may also include optical scanners (not shown).

The steganographic communications analysis engine 301 may operate in a networked environment supporting connections to one or more remote computing devices, such as the computing devices 341 and 351. The computing devices 341 and 351 may be personal computing devices or servers that include any or all of the elements described above relative to the steganographic communications analysis engine 301.

The network connections depicted in FIG. 3 may include a Local Area Network (LAN) 325 and/or a Wide Area Network (WAN) 329, as well as other networks. When used in a LAN networking environment, the steganographic communications analysis engine 301 may be connected to the LAN 325 through a network interface or adapter in the communications module 309. When used in a WAN networking environment, the steganographic communications analysis engine 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
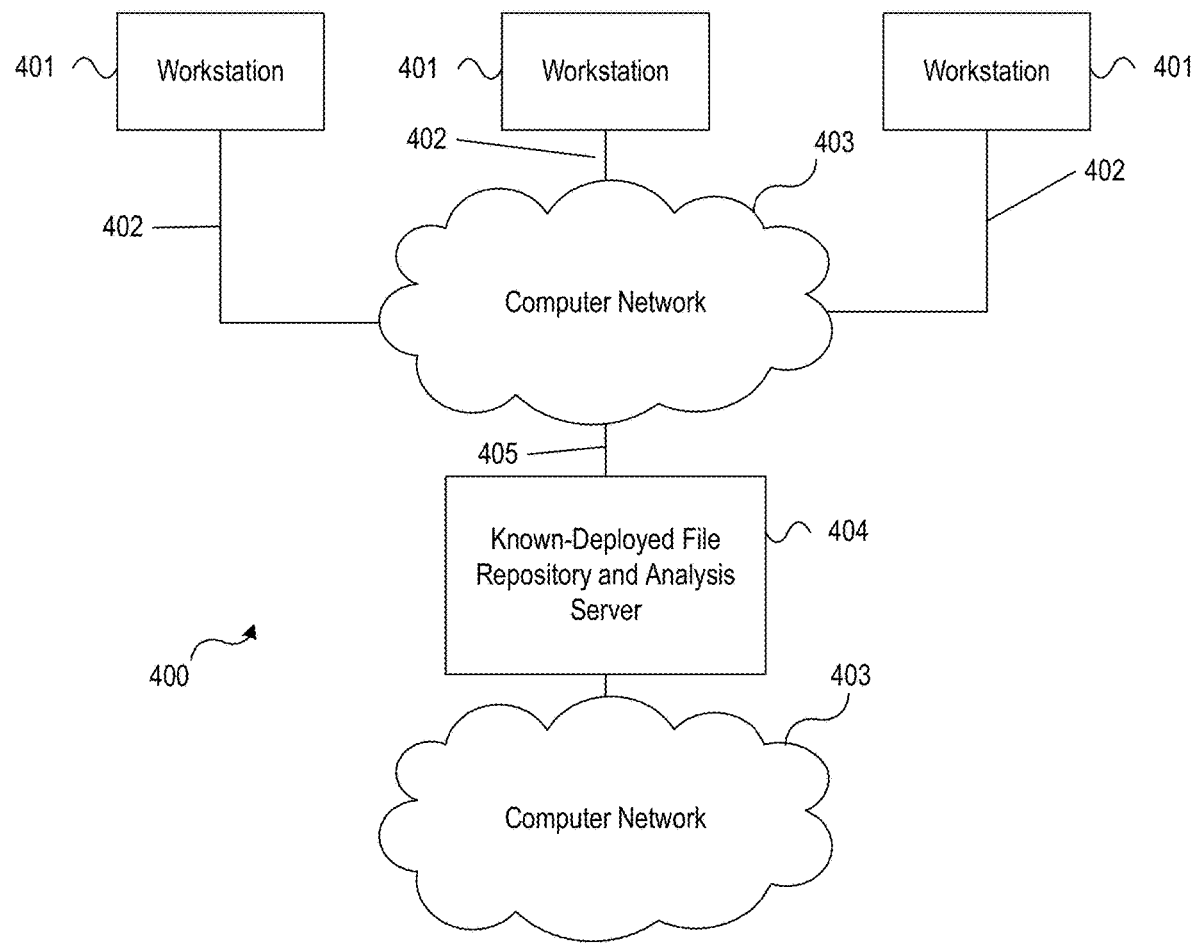
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the steganographic communications analysis server 404. In the system 400, the steganographic communications analysis server 404 may be a server, processor, computer, or data processing device, or combination of the same, configured to perform the functions and/or processes described herein. The steganographic communications analysis server 404 may be used to monitor network communications, identify potential instances of steganographic communications, quarantine suspected compromised device, generate alerts, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the steganographic communications analysis server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A method comprising:
   receiving, via a computing network, a signal indicating storage of a file at a software distribution point (SDP) computing system, wherein the signal is automatically generated by the SDP computing system based on saving of at least one file;
   enumerating, by a known deployed file metadata analysis engine, available files stored on the SDP computing system;
   retrieving, based on a comparison of enumerated files to logical paths associated with the SDP computing system to identify one or more new files and by the known deployed file metadata analysis engine from the SDP computing system via a network, the one or more new files;
   extracting, by the known deployed file metadata analysis engine, metadata from each of the one or more new files;
   recursively extracting, based on an indication that a file of the one or more new files is a container file and by the known deployed file metadata analysis engine, metadata from each file stored in the container file of the one or more new files;
   identifying, by the known deployed file metadata analysis engine, a match of metadata of a file of the one or more new files and metadata stored in a data store comprising information stored of "known-good" files that comprises an indication of one or more of an associated internal development group and a trusted vendor providing "safe" applications;
   enriching, by the known deployed file metadata analysis engine, the matched metadata with an indication that the file is "known-deployed", wherein the indication comprises artifact metadata only available during dynamic execution of a particular entry of an artifact by the known deployed file metadata analysis engine, and wherein the artifact metadata comprises an indication of the SDP and an indication that the file was introduced to a host through methods associated with approved software distribution practices and wherein artifact file metadata is enriched with labels to identify a functionality associated with the artifact;
   triggering, by the known deployed file metadata analysis engine, synchronization of stored metadata to an external computing system based on an update of the matched metadata to allow elimination of deployment-related activity from analysis; and
   causing, based on the synchronization, analysis of newly saved files by the SDP using synchronized metadata to identify potentially malicious content.

2. The method of claim 1, wherein recursively extracting metadata from each file stored in the container file of the one or more new files comprises:
   calculating a first cryptographic hash of a topmost container of the container file and a second cryptographic hash of an immediate second container adjacent the topmost container; and
   halting, by the known deployed file metadata analysis engine, recursive file extraction and metadata generation for the container file based on an indication of a match between the first cryptographic hash or the second cryptographic hash to metadata stored in the data store.

3. The method of claim 1, comprising scheduling, by the known deployed file metadata analysis engine, analysis of the files stored on the SDP on a periodic basis.

4. The method of claim 1, comprising triggering, by the known deployed file metadata analysis engine, analysis of the files stored on the SDP based on an indication that a modified file has been saved.

5. The method of claim 1, comprising triggering, by the known deployed file metadata analysis engine, analysis of the files stored on the SDP based on an indication that a new file has been saved.

6. The method of claim 1, comprising:
   receiving, via the computing network, an electronic message comprising a hash value of a file;
   identifying, by the known deployed file metadata analysis engine based on receipt of the electronic message, metadata associated with files stored in a known-deployed file data store, wherein the files correspond to a match of the received hash value;
   sending, via the computing network by the known deployed file metadata analysis engine and based on an identified match, a first electronic response message comprising an indication of a confirmed match to the received hash value; and
   sending, via the computing network by the known deployed file metadata analysis engine and based on a failure to identify a match to the received hash value, a second electronic response message comprising an indication of a failure to match the received hash value.

7. The method of claim 1, comprising enriching the file metadata stored in the data store with semantic labels to identify whether a file is known to be used for adversary purposes.

8. The method of claim 1 comprising enriching the file metadata stored in the data store with semantic labels to identify whether a file serves a specific purpose within an enterprise computing environment.

9. A system comprising:
   a software distribution point (SDP) computing system comprising memory storing a plurality of files;
   a known-deployed file metadata analysis server comprising:
   a processor; and
   non-transitory memory storing instructions that, when executed by the processor, causes the known-deployed file metadata analysis server to:
   enumerate, based on an indication received from the SDP computing system that indicates at least one file has been created, available files stored on the SDP computing system;
   compare enumerated files to logical paths associated with the SDP computing system to identify one or more new files;

retrieve, from the SDP computing system via a network, the one or more new files;

extract metadata from each of the one or more new files;

recursively extract, based on an indication that a file of the one or more new files is a container file, metadata from each file stored in the container file of the one or more new files;

identify a match of metadata of a file of the one or more new files and metadata stored in a data store comprising information stored of "known-good" files;

enrich the matched metadata with an indication that the file is "known-deployed", wherein the indication comprises artifact metadata only available during dynamic execution of a particular entry of an artifact by the known deployed file metadata analysis server, and wherein the artifact metadata comprises an indication of the SDP and an indication that the file was introduced to a host through methods associated with approved software distribution practices and wherein artifact file metadata is enriched with labels to identify a functionality associated with the artifact;

trigger synchronization of stored metadata to an external computing system based on an update of the matched metadata to allow elimination of deployment-related activity from analysis; and causing, based on the synchronization, analysis of newly saved files by the SDP using synchronized metadata to identify potentially malicious content.

10. The system of claim 9, wherein the instructions further cause the known-deployed file metadata analysis server to:

calculate a first cryptographic hash of a topmost container of the container file and a second cryptographic hash of an immediate second container adjacent the topmost container; and halt recursive file extraction and metadata generation for the container file based on an indication of a match between the first cryptographic hash or the second cryptographic hash to metadata stored in the data store.

11. The system of claim 9, wherein the instructions further cause the known-deployed file metadata analysis server to schedule analysis of the files stored on the SDP on a periodic basis.

12. The system of claim 9, wherein the instructions further cause the known-deployed file metadata analysis server to trigger analysis of the files stored on the SDP based on an indication that a modified file has been saved.

13. The system of claim 9, wherein the instructions further cause the known-deployed file metadata analysis server to trigger analysis of the files stored on the SDP based on an indication that a new file has been saved.

14. The system of claim 13, wherein the instructions further cause the known-deployed file metadata analysis server to trigger analysis of the new file based on the indication that the new file has been saved.

15. The system of claim 9, wherein the instructions further cause the known-deployed file metadata analysis server to enrich the file metadata stored in the data store with semantic labels to identify whether a file is known to be used for adversary purposes.

16. The system of claim 9, wherein the instructions further cause the known-deployed file metadata analysis server to enrich the file metadata stored in the data store with semantic labels to identify whether a file serves a specific purpose within an enterprise computing environment.

17. Non-transitory computer-readable media storing instructions that, when executed by a computing device comprising at least one processor, memory, and a communication interface, cause the computing device to:

enumerate, based on an indication received from a software distribution point (SDP) computing system that indicates at least one file has been created, available files stored on the SDP computing system;

compare enumerated files to logical paths associated with the SDP computing system to identify one or more new files;

retrieve, from the SDP computing system via a network, the one or more new files;

extract metadata from each of the one or more new files;

recursively extract, based on an indication that a file of the one or more new files is a container file, metadata from each file stored in the container file of the one or more new files;

identify a match of metadata of a file of the one or more new files and metadata stored in a data store comprising information stored of "known-good" files;

enrich the matched metadata with an indication that the file is "known-deployed", wherein the indication comprises artifact metadata only available during dynamic execution of a particular entry of an artifact by a known deployed file metadata analysis engine, and wherein the artifact metadata comprises an indication of the SDP computing system and an indication that the file was introduced to a host through methods associated with approved software distribution practices and wherein artifact file metadata is enriched with labels to identify a functionality associated with the artifact;

trigger synchronization of stored metadata to an external computing system based on an update of the matched metadata to allow elimination of deployment-related activity from analysis; and causing, based on the synchronization, analysis of newly saved files by the SDP using stored synchronized metadata to identify potentially malicious content.

18. The non-transitory computer readable media of claim 17, wherein the instructions further cause the computing device to:

calculate a first cryptographic hash of a topmost container of the container file and a second cryptographic hash of an immediate second container adjacent the topmost container; and halt recursive file extraction and metadata generation for the container file based on an indication of a match between the first cryptographic hash or the second cryptographic hash to metadata stored in the data store.

19. The non-transitory computer readable media of claim 17, wherein the instructions further cause the computing device to schedule analysis of the files stored on the SDP computing system on a periodic basis.

20. The non-transitory computer readable media of claim 17, wherein the instructions further cause the computing device to trigger analysis of the new file based on the indication that the new file has been saved.

* * * * *